RE 25369

May 17, 1960     P. A. REDHEAD     2,937,295

IONIZATION GAUGE FOR THE MEASUREMENT OF LOW PRESSURES

Filed May 7, 1957

INVENTOR
PAUL A. REDHEAD

AGENT
R. J. Filipkowski

United States Patent Office 2,937,295
Patented May 17, 1960

2,937,295

IONIZATION GAUGE FOR THE MEASUREMENT OF LOW PRESSURES

Paul Aveling Redhead, Ottawa, Ontario, Canada, assignor to National Research Council, Ottawa, Ontario, Canada, a body corporate of Canada Application May 7, 1957, Serial No. 657,624

1 Claim. (Cl. 313—7)

This invention relates to a vacuum gauge of the ionization type and particularly concerns ionization vacuum gauges employing a magnetic field throughout an ionizing space.

Conventional ionization vacuum gauges are constructed somewhat resembling a triode vacuum tube employing a filamentary cathode, an accelerating grid, and a cylindric plate electrode, electrons emitted from the filament moving at high velocity toward and through the positive grid colliding with ionizing molecules of a gas filling the tube. The number of ions produced by kinetic collisions per unit time is assumed proportional to the density of the gas, all other factors remaining constant, and hence proportional to pressure. A current obtained by collecting the ions so produced upon the negatively charged electrode is measured to provide an indication of the degree of vacuum. Actually it is the ratio of ion current measured to the electron current to the grid of such devices that may correctly be said to represent the pressure. Owing to fundamental limitations the gauge current indications are not valid for pressures below about $10^{-8}$ mm. of mercury.

In order to increase by a large factor the possibility that moving electrons liberated from a source will yield a useful ion population by maintaining a gas discharge in the chamber, a unidirectional magnetic field has been applied of such shape and intensity with respect to the electrodes as to cause spiral paths to be taken by the electrons. Orbitally spiralling ions have their cathode-to-anode track lengths greatly increased as compared with the radial distance between a source of initiating electrons and an ion collector. A device operating on this principle is described in United States Patent 2,197,079 to Penning, using a cold cathode with a ring or cylindric anode. With devices of this type using nitrogen for example, pressures as low as $10^{-6}$ mm. Hg are observable. However the establishment of an avalanche discharge becomes impossible at the lower limits of pressure since the electron source is inefficient when the mean free path distances between gas molecules become a large fraction of the anode-cathode distance. Moreover, only the total current of the space discharge is measurable in such device, precluding the exclusion of electron current and photon currents from the measured total. At the pressure indicated the ion current becomes a small fraction of the total measured.

The range of pressures extending between about $10^{-8}$ and $10^{-11}$ mm. Hg are presently measurable by a special type of ionization gauge known as a Bayard-Alpert gauge as described in an article "New Developments in the Production and Measurement of Ultra-high Vacuum," D. Alpert, J.A.P. 24, 860, 1953. A gauge of the latter type has been shown to also act as an ionization pump in attaining the lowest measurable vacuum. The gauge employs a heated filament externally of a positive accelerating grid, and both ion current to a central anode wire and electron current to the accelerating grid are measured to establish the pressure.

Hitherto all existing ionization gauge measurements have included error current due to X-ray effects which confuse the lowest measurable ion current indications observable. The ionizing electrons in the gauge produce X-rays on collision with metal anode, grid, or wall structure, which in turn cause photoelectric emission of photons from the positive ion collector and from the envelope walls. Photoelectric currents due to such excitation by X-rays are indistinguishable from the net ion current at the positive ion collector. Therefore, depending on the geometry of the tube, the lowest measurable ion collector current is predominantly photo-electron emission current at pressures of the order of $10^{-8}$ mm. Hg and below. The Bayard-Alpert design, for example as described and claimed in United States Patent 2,605,431 to Bayard, has lowered this limit to about $10^{-11}$ mm. Hg by a design making the anode slender to intercept a very small solid angle, and insulating the ion collector lead to minimize charge leakage from glass walls.

The present invention seeks to avoid the difficulties of X-ray emission and inefficient ionization mechanism which have hitherto been limiting factors, by relying upon cold emission of electrons, spirally lengthened ion and electron paths, and isolating the positive ion collector from other electrodes. Embodiments of the invention are characterized in that the function of electron emission is reserved solely to an auxiliary cold electrode while the collection of positive ions within an ionization space is solely performed by a separate electrode. These are referred to hereinafter, respectively, as the auxiliary cathode and the main cathode. According to the invention a central anode of rod shape is coaxially related within an enclosing cylindric shell main cathode having apertures in its end walls, and disc-like auxiliary cathodes having apertures through which the high voltage anode extends located adjacently to and outside of the ends of the main cathode, the cold emission of electrons from the edges of the auxiliary cathode apertures being due to field emission under high potential gradients.

The anode is given a high positive voltage with respect to the auxiliary cathode which is maintained at ground potential while the positive ion current reaching the main cathode is measured by a micro-current-sensing device connected in series between it and ground. A strong magnetic field is applied along the axis of the device in the direction of the anode, which causes the electron paths to become spirals whose lengths are on the average many hundreds of times greater than the electron path lengths in the absence of the magnetic field. By this increase of path length and by the improved mechanism of electron emission a high ionization efficiency is produced and a high sensitivity is thereby also developed. Hence a measurable flow of ion current is realized even with pressures well below $10^{-11}$ mm. Hg.

Embodiments of the invention herein described may be the better understood by reference to the accompanying figures of drawing, wherein.

Figure 1:
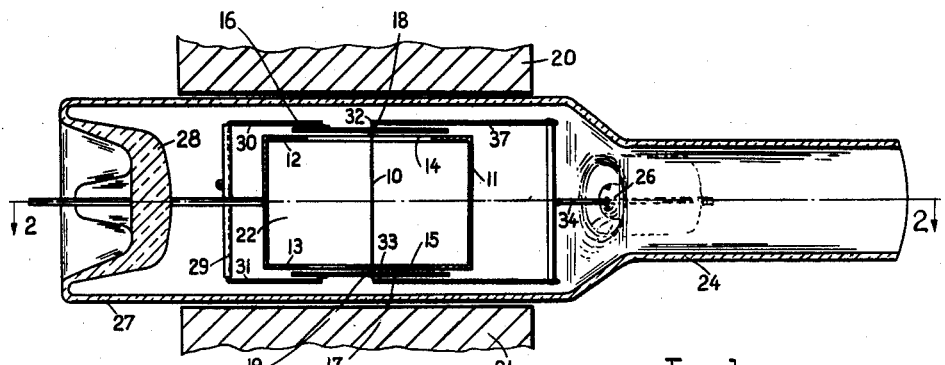
Figure 1 is a longitudinal axial section showing the arrangement of electrodes.

The apparatus shown in Figure 1 consists essentially of three electrodes, namely, straight anode wire 10 coaxial with the cylindrical cathode shell 11 having end plates 12 and 13 with large central holes 14 and 15, and two auxiliary cathodes 16 and 17 which are flat discs closely spaced from the end plates of the main cathode, and having small central holes 18 and 19 coaxial with the anode. High positive potential of the order of 5 to 10 kilovolts for example is applied to the anode with respect to the grounded cathode, and a unidirectional magnetic field is applied along the axis of the gauge, supplied as by pole pieces 20, 21. A small number of electrons are emitted from the edge of the holes 18 and 19 by field emission. These electrons are drawn into the cathode cylinder 11 by the electric field adjacent the emission region, wherein the equipotentials are surfaces of revolution about the anode. A certain proportion of the total electrons liberated move into the cylindrical chamber 22 where under the influence of radial electric and axial magnetic fields they orbit about the anode wire and drift axially, eventually being collected upon the anode wire. By virtue of the coaxial relationship, the gradient between the main cathode and the anode as observed in a plane passed normally through the middle of the collector is logarithmic. The inward radial acceleration of electrons is relatively small until they have orbited to a relatively very short distance from the anode. Both the initial electrons and those liberated from gas molecules upon ionization contribute to the production of positive ions by collision with the gas molecules within the cathode cylinder space 22 during their spiral transits towards the anode. These positive ions move outwards in generally curved paths and finally reach the main cathode 11 to which they give up their charges. The rate of charge transport is detected and indicated by any suitable device 23 connected between the cathode and ground capable of reading very weak currents.

It will be apparent that in the construction described the current passing to the electron-emitters 17 and 18 is entirely separate from the ion-collector current, so that the concept of a ratio of currents as has heretofore required to be considered in ionization gauges does not pertain to the device according to the invention.

Photo-electron current resulting from X-rays within the collector 11, generated by electrons striking the anode wire, are reduced very considerably in comparison with prior art apparatus by the practice of the invention. In contrast with prior art efforts to mitigate the X-ray radiation received by a positive-ion current collector, by geometry of the gauge elements, the invention provides a magnetic field by which the net photoelectron flow from the main cathode is caused to be very small. X-ray radiation from the anode rod impinges upon the main cathode freely, causing relatively copious numbers of photoelectrons to be emitted as a result of this energy. However the great majority of these are ejected at low energies and hence make orbits of small radius into space 22, returning to the surface. The net liberation of photoelectrons from the main cathode 11 does not compare with the positive ion current thereto until a gas pressure below about $10^{-14}$ mm. Hg is attained, due to the greatly increased ionization efficiency of the apparatus.

Figures 3, 4:
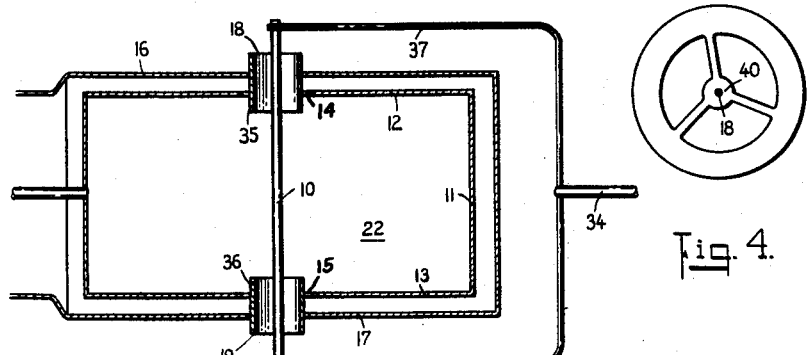
Figure 3 is a modification of the electrode structure of Figure 2 showing alternate auxiliary electrode structure; and, Figure 4 is an illustration of a modified cathode.

In Figure 3 modified field-emission cathodes 18 and 19 suitable for use in devices measuring the lowest pressures are provided with cylindric baffles 35, 36 coaxial with the anode, whose functions are partly to intercept and attenuate such X-rays as emanate from the anode with substantially radial directions, and partly to shield the main cathode end discs 12 and 13. In this embodiment the inner radius of each of the discs 12 and 13 is made relatively small to provide a small clearance of about one mm. from the outer face of the baffle. The auxiliary cathodes are also preferably formed of a single sheet of metal bent to form a box-like shield to reduce external influences on the main cathode which would otherwise impair the accuracy of current measurements.

Figure 2:
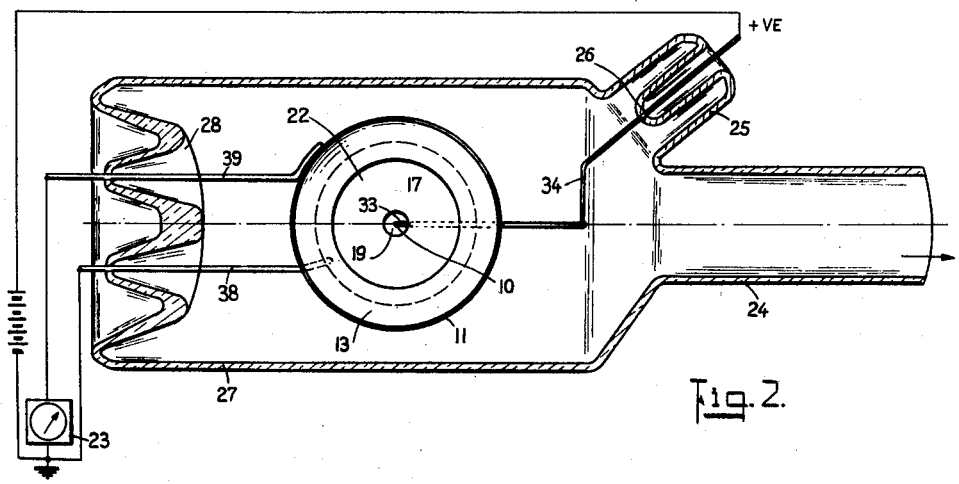
Figure 2 is a plan view of the apparatus of Figure 1 partly in section along line 2—2.

Referring to Figures 1 and 2, the apparatus includes an envelope 27 of a material which is impervious to gas but pervious to magnetic field, having two flat opposed faces adapted to lie between the pole pieces 20, 21, a press 28 in one end, a tubular pumping connection 24, and an anode lead-supporting tubulation 25 having a re-entrant portion 26. It has been found that by passing the anode connection through the envelope wall at a location remote from the press 28, and preferably by supporting it on a re-entrantly folded tubulation 26, leakage current errors to the ion collector lead-in are minimized.

Cathode 11 is preferably formed of a screen or gauze so that flow of gas molecules to the interior space 22 is not impeded. The end walls 12 and 13 are preferably of mesh form or pierced, and the openings 14 and 15 should be at least one collector radius distance in diameter. The structure is supported on a lead-in wire by a rigid bar 29 spot welded to stiff wires 30, 31 attached to the ends of the cathode. The anode is a slender rod, preferably of tungsten, of about 0.040 inch diameter, under slight tension between the ends 32, 33 of a U-shaped wire 37, which is itself spot-welded to anode lead-in 34. The cold-cathode discs 16, 17 are similarly supported on a lead-in 38 secured in press 28. By the construction described a rigid assembly is realized with minimum leakage currents along the envelope inner surfaces between electrodes.

The anode rod diameter has been found to have an influence on the striking voltage required to start up the ionization discharge. Extremely fine anode wires exhibit a characteristic non-linear relationship of striking voltage with respect to wire diameter, for anodes less than about one mm. diameter. Preferred sizes of anode are fractionally larger than one mm. diameter.

Figure 4 describes an alternative cathode disc construction whereby minimum obstruction is offered to the axial movement of gas molecules into chamber 22. A ring 40 having an aperture 18 whose inner edge is made sharp for field emission is supported by three radial arms. Numerous other modifications will suggest themselves, and the use of gauze instead of radial arms is envisaged. A point or spike cathode presented adjacent the anode may be substituted in lieu of the disc or ring structure described. Cathodes 16 and 17 are preferably made of any reasonably refractive metal.

Ion gauges have been shown heretofore to serve effectively as pumps for evacuating a system at pressures which are already low, for example below about $10^{-3}$ mm. Hg. In general the pumping speed of a gauge wherein the outgassing is strictly by electrical capture and adsorption of ions, is dependent on the area of negatively charged surfaces and on the ionization efficiency expressed as the net number of ions formed per second within the space. The time taken to reduce the pressure of a closed system to the $1/e$ value of the pressure difference between an actual pressure $p$ and the ultimate pressure $p_U$, is directly proportional to the volume and inversely proportional to the pumping speed. It is directly apparent that any apparatus capable of ionizing gas molecules and entrapping ions at a high rate will have a high pumping speed. Experiments have amply verified that gauges constructed according to the invention are highly efficient pumps and are relatively insensitive to the strength of initiating electron current liberated from the cathode.

In an actual embodiment according to Figure 3, the interior diameter of the main cathode was 30 mm., the axial length 15 mm., the field strength 2000 gausses, and the applied voltage 5 kilovolts. The measured pumping speed at $10^{-9}$ mm. for dry air was of the order of 0.05 liter/sec.

While I have described embodiments of my invention in considerable detail I wish it to be understood that I am not limited to the particular forms or applications which have been described since many changes of omission, addition, and substitution can be made without departing from the broader aspects of the invention, as may be fairly construed to lie within the scope of the appended claim.

I claim:

In an ionization vacuum gauge, a non-conductive enclosure adapted to contain a sample of a rarefied gas, an insulatedly supported cathode electrode adapted to be connected to a source of reference potential comprising an annular disc having a small bore therein and a coaxial tubular shell integral therewith surrounding the bore, means to support a filamentary anode adapted to have a source of high positive voltage connected thereto coaxially of the disc and extending beyond the tubular shell, an insulatedly supported closed cylindric shell ion collector having apertured end walls coaxial of the anode and separate from and spaced from the cathode, said tubular shell extending within the collector and having a diameter substantially less than the diameter of the aperture of said end walls, and means to impress a magnetic field through the collector directed along the axis of said cylindric shell.

References Cited in the file of this patent
UNITED STATES PATENTS

| | | |
|---|---|---|
| 2,774,936 | Beck | Dec. 18, 1956 |
| 2,757,306 | Conn | July 31, 1956 |